United States Patent Office 3,689,478
Patented Sept. 5, 1972

3,689,478
PROCESS FOR THE PREPARATION OF OPTICALLY ACTIVE 3 - ALKOXY BENZODIAZEPINE DERIVATIVES
Giancarlo Jommi, Milan, Francesco Mauri, Sesto San Giovanni, and Giovanna Riva, Milan, Italy, assignors to Ravizza S.A., Lausanne, Switzerland
No Drawing. Filed May 27, 1971, Ser. No. 147,601
Claims priority, application Great Britain, June 2, 1970, 26,506/70
Int. Cl. C07d 53/06
U.S. Cl. 260—239.3 D          6 Claims

ABSTRACT OF THE DISCLOSURE

Process for the preparation of optically active 3-alkoxy benzodiazepines of the formula

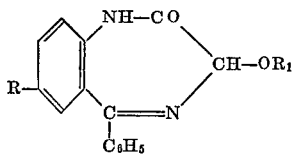

wherein R is selected in the group consisting of halogen and nitro and $R_1$ is selected in the group consisting of linear alkyl radicals with 1–6 carbon atoms, by etherifying with an alcohol, in the presence of an acid substance the corresponding 3-hemisuccynyloxy derivative having the same kind of optical activity. The dextrorotary forms of the compounds of the Formula I are pharmaceutically superior to the corresponding levorotatory compounds.

---

The present invention is concerned with a process for the preparation of optically active 3-alkoxy benzodiazepines comprised in the general formula

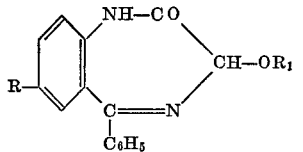

wherein R is selected in the group consisting of halogen and nitro, and $R_1$ is selected in the group consisting of linear alkyl radicals with 1–6 carbon atoms.

More precisely the present invention is concerned with a process for the preparation of optically active 3-alkoxy benzo-diazepines starting from optically active 3-hemisuccynyloxy derivatives having the same kind of optical activity.

The compounds of Formula I are already known and it is also known that they are valuable psycho-drugs endowed in particular with sedative, anticonvulsivant and muscle relaxant activity. However, up to the present they had not received a particular attention due to the fact that they did not appear of greater activity than other already known benzodiazepines.

We have now found that of the two optical antipodes constituting the racemic mixture of the ether compounds of Formula I, the dextrorotatory forms shows by far better therapeutic indexes than the levorotartory ones, thus constituting, if isolated, most interesting psycho-drugs useful for example as sedative and anticonvulsant products, superior to some benzo-diazepines already on the market. In application Ser. No. 726,673, filed Mar. 25, 1970 a process has been described for the resolution of racemic 3 - succynyloxy-5-phenyl-1,3-dihydro-2H-1,4-benzodiazepine-2-one derivatives (hemisuccinates) of the formula:

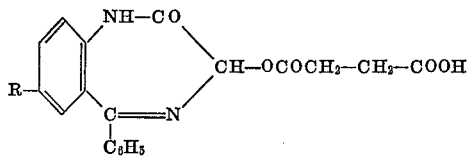

wherein R is halogen, nitro.

This process consists essentially in that the racemic compound of Formula II is salified with (+)ephedrine or (—)ephredrine. The two salts formed, containing respectively the (+)hemisuccinate and the (—)hemisuccinate, are separated taking advantage of their sharply different solubilities in ethyl acetate. The separated ephedrine salts are then splitted by acid hydrolysis and the pure hemisuccinates recovered by precipitation.

We have now found a process according to which a (+)hemisuccinate of Formula II is transformed in the corresponding (+)3-alkoxy derivative of Formula I, as well as a (—)hemisuccinate of Formula II is transformed in the corresponding (—)3-alkoxy derivative of Formula I.

The new process object of the present invention consists essentially in that an optically active hemisuccinate is treated with the desired etherifying alcohol in the presence of suitable substances. The desired alcohol is preferably used in such an excess to act also as reaction solvent.

Particularly suitable acid substances are: HCl, $SOCl_2$, $POCl_3$.

We have also found that it is quite critical, in order to avoid any racemization of the starting product, to operate in the absence of water and with at least one equivalent of acid compound. In particular, anhydrous starting hemisuccinates must be used. As a matter of fact we have found that in the presence of water an amount of racemic product proportional to the amount of water forms, while if less than one equivalent of acid is used, an amount of racemic 3-alkoxy derivative proportional to the amount of lacking acid forms. The preferred proportion of acid to be used is from 1 to 6 equivalents per mole of starting hemisuccinate. The reaction is preferably carried out at a temperature between room temperature and —10° C. The reaction is completed within a maximum time of 60 minutes. The yield is in any case very high and in many cases nearly quantitative. The highly active dextro-form of the compounds of Formula I may be administered under any suitable administration form such as tablets, capsules, suppositories and the like.

We now report hereinafter for illustrative but not limitative purposes some preparative examples of a number of the optically active compounds according to the invention.

EXAMPLE 1

0.027 mole of thionylchloride are added to 100 cc. of anhydrous ethyl alcohol while keeping the temperature at —10° C. Then 0.0258 mole of (+)7-chloro-3-succynyloxy - 5 - phenyl-1,3-dihydro-2H-1,4-benzodiazepine-2-one are added little by little to the alcoholic solution. Cooling is discontinued and the temperature is allowed to raise to room temperature, i.e. to about 25° C.

A yellow solution forms which after 20 minutes is neutralized with triethylamine and added with water up to complete precipitation of (+)7-chloro-3-ethoxy-5-phenyl-1,3-dihydro-2H-1,4-benzodiazepine-2-one. This product is filtered, dried and crystallized from benzene or 95° ethanol. Yield nearly quantitative.

The physical characteristics of the prepared product are as follows:

*Analysis.*—Calculated for $C_{17}H_{15}N_2O_2Cl$ (percent): C=64.87; H=4.80; N=8.90. Found (percent): C=64.58; H=4.71; N=8.84.

M.W.=314.78; M.P.=194° C.

$[\alpha]_D^{20}$=+276° (c.=2% in dioxane).

Quite at the same manner the (+)7-bromo-3-ethoxy-5-phenyl-1,3-dihydro-2H-1,4-benzodiazepine-2-one is prepared, having the following characteristics:

*Analysis.* — Calculated for $C_{17}H_{15}N_2O_2Br$ (percent): C=56.90; H=4.17; N=7.80. Found (percent): C=56.78; H=4.29; N=7.63. M.W.=359.22; M.P.=171° C.

$[\alpha]_D^{20}$=+252° (c.=2% in dioxane).

EXAMPLE 2

0.054 mole of thionyl chloride are added to 100 cc. of anhydrous ethyl-alcohol while keeping the temperature at —10° C. Then 0.0258 mole of (+)7-chloro-3-succynyloxy - 5 - phenyl-1,3-dihydro-2H-1,4-benzodiazepine-2-one are added little by little, cooling is discontinued and the temperature is allowed to raise up to room temperature, i.e. up to about 25° C. A yellow solution is obtained which after 20 minutes is neutralized with triethylamine and diluted with water up to complete crystallization of the formed (+)7 - chloro-3-ethoxy-5-phenyl-1,3-dihydro-2H-1,4 - benzodiazepine-2-one. The product is filtered, dried and crystallized from benzene or 95° ethanol. The yield is quantitative, the physical characteristics are identical to those indicated in the preceding example.

EXAMPLE 3

0.027 mole of $PCCl_3$ are added under stirring to 100 cc. of anhydrous ethyl alcohol, while keeping the temperature at —10° C. Then 0.0258 mole of (+)7-chloro-3 - succynyloxy-5-phenyl-1,3-dihydro-2H-1,4-benzodiazepine-2-one are added little by little, cooling is discontinued and the temperature is allowed to raise to about 25° C. A yellow solution forms which after 20 minutes is neutralized with triethylamine and then diluted with water up to complete precipitation of the crystalline (+)7-chloro-3-ethoxy - 5 - phenyl-1,3-dihydro-2H-1,4-benzodiazepine-2-one. The product is filtered, dried and crystallized from benzene or 95° ethanol.

The yield is nearly quantitative and the physical characteristics are identical to those of the product prepared according to the Examples 1 and 2.

EXAMPLE 4

0.054 mole of $POCl_3$ are added under stirring to 100 cc. of anhydrous ethyl alcohol while keeping the temperature at —10° C. Then 0.0258 mole of (+)7 - chloro - 3 - succynyloxy - 5 - phenyl - 1,3 - dihydro - 2H - 1,4 - benzodiazepine - 2 - one are added little by little, cooling is discontinued and the temperature is allowed to raise to about 25° C. A yellow solution forms which after 20 minutes is neutralized with triethylamine and then diluted with water up to complete precipitation of the crystalline (+)7 - chloro - 3 - ethoxy - 5 - phenyl - 1,3 - dihydro-2H - 1,4 - benzodiazepine - 2 - one. The product is filtered, dried and crystallized from benzene or 95° ethanol.

The yield is nearly quantitative and the physical characteristics are identical to those of the product prepared according to the preceding examples.

EXAMPLE 5

To a solution containing 0.027 mole of anhydrous HCl in 100 cc. of ethyl alcohol, 0.0258 mole of (+)7-chloro - 3 - succynyloxy - 5 - phenyl - 1,3 - dihydro-2H - 1,4 - benzodiazepine - 2 - one are added little by little under stirring.

After 20 minutes a complete solution is reached, it is neutralized with triethylamine, diluted with water up to complete precipitation and filtered.

The crystalline product is recrystallized from benzene or 95° ethyl alcohol and the pure (+)7 - chloro - 3-ethoxy - 5 - phenyl - 1,3 - dihydro - 2H - 1,4 - benzodiazepine - 2 - one is obtained with nearly quantitative yield. The physical characteristics are identical to those of the product prepared according to the preceding examples.

EXAMPLE 6

0.027 mole of $SOCl_2$ are added under stirring to 100 cc. of anhydrous ethyl alcohol while keeping the temperature at —10° C. Then 0.0258 mole of (—)7 - chloro - 3-succynyloxy - 5 - phenyl - 1,3 - dihydro - 2H - 1,4 - benzodiazepine - 2 - one are added little by little, cooling is discontinued and the temperature allowed to raise up to 25° C. A yellow solution is obtained which after 20 minutes is neutralized with triethylamine and then diluted with water up to complete precipitation. The crystalline product is filtered, dried and recrystallized from benzene or 95° ethanol.

Yield nearly quantitative of (—)7 - chloro - 3 - ethoxy-5 - phenyl - 1,3 - dihydro - 2H - 1,4 - benzodiazepine-2-one.

*Analysis.*—Calculated for $C_{17}H_{15}N_2O_2Cl$ (percent): C=64.87; H=4.80; N=8.90. Found (percent): C=64.68; H=4.89; N=8.89.

M.W.=314.78; M.P.=194° C.

$[\alpha]_D^{20}$=—276° (c.=2% in dioxane).

EXAMPLE 7

0.027 mole of $SOCl_2$ are added under stirring to 100 cc. of anhydrous methyl alcohol while keeping the temperature at —10° C. Then 0.0258 mole of (+)7 - chloro-3 - succynyloxy - 5 - phenyl - 1,3 - dihydro - 2H - 1,4-benzodiazepine - 2 - one are added little by little, cooling is discontinued and the temperature allowed to raise up to 25° C. A yellow solution is obtained which after 20 minutes is neutralized with triethylamine and diluted with water up to complete precipitation of (+)7 - chloro-3-methoxy - 5 - phenyl - 1,3 - dihydro - 2H - 1,4 - benzodiazepine - 2 - one. The mass of crystals is filtered and crystallized from 95% ethyl alcohol.

Nearly quantitative yield.

*Analysis.*—Calculated for $C_{16}H_{13}N_2O_2Cl$ (percent): C=63.90; H=4.36; N=9.32. Found (percent): C=63.68; H=4.21; N=9.24.

M.W.=300.74; M.P.=136° C.

$[\alpha]_D^{20}$=+307° C. (c.=2% in dioxane).

EXAMPLE 8

0.027 mole of $SOCl_2$ are added under stirring to 100 cc. of anhydrous methyl alcohol. Then 0.0258 mole of (—)7 - chloro - 3 - succynyloxy - 5 - phenyl - 1,3 - dihydro - 2H - 1,4 - benzodiazepine - 2 - one are added little by little, cooling is discontinued and temperature is allowed to raise up to room temperature, i.e. to nearly 25° C. A yellow solution is obtained which after about 20 minutes is neutralized with triethylamine and diluted with water up to complete precipitation. The formed mass of crystals is filtered and recrystallized from 95% ethyl alcohol. (—)7 - chloro - 3 - methoxy - 5 - phenyl - 1,3-dihydro - 2H - 1,4 - benzodiazepine - 2 - one is obtained with nearly quantitative yield, having physical characteristics identical to those of the product obtained according to the process of the preceding example, except for the rotatory power which is as follows:

$[\alpha]_D^{20}$=—307° (c.=2% in dioxane).

EXAMPLE 9

0.027 mole of $SOCl_2$ are added under stirring to 100 cc. of anhydrous butyl alcohol while keeping the temperature at —10°. Then 0.0258 mole of (+)7-chloro-3-succynyloxy-5-phenyl-1,3-dihydro-2H-1,4-benzodiazepine - 2-one are added little by little, cooling is discontinued and the temperature is allowed to raise to room temperature, i.e. to nearly 25° C.

The yellow solution obtained is neutralized, after about 20 minutes, with triethylamine and diluted with water up to complete precipitation of the formed, crystalline (+)7-chloro-3-butoxy-5-phenyl-1,3-dihydro - 2H - 1,4 - benzodiazepine-2-one. The crystalline mass is recrystallized from diluted ethyl alcohol and the pure product shows the following physical characteristics:

*Analysis.*—Calculated for $C_{19}H_{19}N_2O_2Cl$ (percent): C=66.56; H=5.59; N=8.17. Found (percent): C=66.30; H=5.53; N=8.10.

M.W.=342.82; M.P.=131° C.

$[\alpha]_D^{20}$=+230° (c.=2% in dioxane).

EXAMPLE 10

0.027 mole of $SOCl_2$ are added under stirring to 100 cc. of anhydrous ethyl alcohol while keeping the temperature at —10° C. Then 0.0258 mole of (+)7-nitro-3-succynyloxy-5-phenyl-1,3-dihydro - 2H-1,4-benzodiazepine-2-one are added little by little to the solution, cooling is discontinued and the temperature is allowed to raise up to room temperature.

The yellow solution obtained is neutralized after about 20 minutes, with triethylamine and diluted with water up to complete precipitation of the formed, crystalline (+)7-nitro-3-ethoxy-5-phenyl-1,3-dihydro - 2H - benzodiazepine-2-one. The crystalline mass is recrystallized from a mixture of dioxane-water and the pure product shows the following characteristics:

*Analysis.*—Calculated for $C_{17}H_{15}N_3O_4$ (percent): C=62.75; H=4.62; N=12.90. Found (percent): C=62.32; H=4.74; N=12.61.

M.W.=325.31; M.P.=242° C.

$[\alpha]_D^{20}$=+585° (c.=2% in dioxane).

The pharmacological test performed with the most important among the claimed compounds, namely the (+)7-chloro-3-ethoxy-5-phenyl-1,3-dihydro-2H - 1,4 - benzodiazepine-2-one (+A) and the (+)7-nitro-3-ethoxy-5-phenyl-1,3-dihydro-2H-benzodiazepine-2-one (+B), in comparison with the racemic (±) and levo (—) compounds, have given the hereinafter reported values

|  | (+)A | (±)A | (—)A | (+)B | (±)B | (—)B |
|---|---|---|---|---|---|---|
| I.P.[1] $LD_{50}$, mg./kg. | 585 | 360 | 445 | 1,163 | 1,055 | 845 |
| $ED_{50}$[2] for cardiazol test, mg./kg. | 4.2 | 13 | >13 | 3.23 | 9.8 | 7.95 |
| $ED_{50}$[3] for barbiturate test, mg./kg. | n.d. | n.d. | n.d. | 5.0 | 15 | 8.4 |

[1] 50% lethal dose determined by intraperitoneal injection.
[2] 50% effective dose in protecting male Albine Swiss mice from 120 mg./kg. intraperitoneally injected cardiazol (dose intraperitoneally injected 30 minutes before cardiazol).
[3] 50% effective dose for prolonging by 50% the sleep induced in male Albine Swiss mice by 35 mg./kg. of intraperitoneally injected pentobarbital.

The pharmacological results have been quite confirmed by clinical tests. In order to have data as reliable as possible, the products were administered to healthy men. Moreover the various optical forms of the drugs were administered to the same individuals, spacing the administration by two weeks. With all the treated individuals a clear tranquillizing activity resulted when the dextrorotatory compounds were used.

What is claimed is:

1. Process for the preparation of optically active 3-alkoxy benzodiazepines of the formula

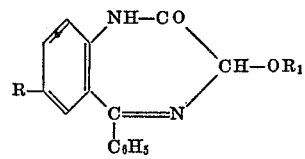

wherein R is selected in the group consisting of halogen and nitro, and $R_1$ is selected in the group consisting of linear alkyl radicals with 1–6 carbon atoms, characterized in that the corresponding 3-hemisuccynyloxy derivatives having the same kind of optical activity are treated with an aliphatic alcohol containing 1–6 carbon atoms in the presence of an inorganic acid compound.

2. Process according to claim 1, characterized in that the inorganic acid compound is selected from the group consisting of HCl, $SOCl_2$, $POCl_3$.

3. Process according to claim 1, characterized in that the inorganic acid compound is used in amount of 1 to 6 equivalents per mole of starting 3-hemisuccynyloxy derivative.

4. Process according to claim 1, characterized in that the aliphatic alcohol is used in excess of the stoichiometric amount such as to constitute a reaction medium.

5. Process according to claim 1, characterized in that it is carried out in the absence of water.

6. Process according to claim 1, characterized in that it is carried out at temperatures comprised between —10° C. and room temperature for a maximum reaction time of 60 minutes.

References Cited

FOREIGN PATENTS 2,016,810  11/1970  Germany _____ 260—239.3 D

HENRY R. JILES, Primary Examiner

R. T. BOND, Assistant Examiner

U.S. Cl. X.R.

424—244